United States Patent [19]
Zelina et al.

[11] 3,883,791
[45] May 13, 1975

[54] THREE PHASE SEQUENCE INSENSITIVE FULL RANGE SCR FIRING CIRCUIT

[75] Inventors: William B. Zelina, Edinboro; Joseph M. Allison, Wesleyville, both of Pa.

[73] Assignee: McGraw-Edison, Elgin, Ill.

[22] Filed: Mar. 15, 1974

[21] Appl. No.: 451,687

[52] U.S. Cl. ................. 321/5; 321/13; 321/19; 321/47
[51] Int. Cl. ............................................. H02m 7/20
[58] Field of Search ............... 321/5, 13, 18, 19, 47, 321/38, 40; 323/22 SC, 20

[56] References Cited
UNITED STATES PATENTS

| | | |
|---|---|---|
| 3,593,105 | 7/1971 | Brohaugh .............................. 321/5 |
| 3,609,509 | 9/1971 | Lafuze ............................... 321/18 X |
| 3,644,753 | 2/1972 | Ginsberg ........................ 321/47 UX |
| 3,671,836 | 6/1972 | Kolatorowicz et al. ............ 321/5 X |
| 3,824,444 | 7/1974 | Spink ..................................... 321/5 |

Primary Examiner—Gerald Goldberg

[57] ABSTRACT

A three phase SCR firing circuit for a DC power supply is disclosed herein. The firing circuit is not effected by the sequence in which the three power lines are connected to the firing circuit and the circuit fully controls the output of the SCRs over the full range of power output of the SCRs.

9 Claims, 3 Drawing Figures

THREE PHASE SEQUENCE INSENSITIVE FULL RANGE SCR FIRING CIRCUIT

REFERENCE TO PRIOR ART

Three phase SCR firing circuits for DC power supplies are well known in the art. Examples of three phase SCR firing circuits for DC power supplies are described in *Three Phase SCR Firing Circuits For DC Power Supplies*, by J. D. Atherly, et al.; General Electric Application Note 200.21, Jan. 1962. However, these firing circuits are both either sensitive to the sequence which the power lines are connected to the control or not controllable over the full range of power output of the SCRs.

The common approach to full range control in a half-controlled converter is to generate three pulse trains — a separate pulse train to trigger each of the three SCRs. The pulse trains each have a repetition rate equal to the power line frequency. The pulse trains are phase locked to the power line at three equally spaced phases. If the three pulse trains are viewed simultaneously, there are three equally spaced pulses per power line cycle. Control of the DC output from the supply is effected by phase modulating the pulses over a range of 180 electrical degrees of the power line cycle. The three pulse trains are generated by three separate phase modulators, all modulators responding (equally) to a common control signal input.

The term, half-controlled converter, is in contradistinction to the term, full-converter. The full-converter is a three phase bridge rectifier, AC to DC, controlled power conversion system having six controlled rectifiers. The half-controlled converter contains three controlled rectifiers in combination with three uncontrolled rectifiers. The system control sampling rate for the full-converter is six times the power line frequency while the half-controlled converter samples at half this rate.

GENERAL DESCRIPTION OF INVENTION

The firing circuit disclosed herein is implemented by a tri-state memory that receives pulses from a modulator and connects to a gate control means for the SCR gates. "True" sequence of the states of the memory follow the power line phase sequence and the memory steers the gate pulses to the "correct" SCR because the next gate pulse is steered to the SCR that has been "remembered" as the one that first received forward anode-cathode voltage (from the power line) following the present gate pulse.

The present memory state is held for as long as the following conditions are true: (1) the SCR identified with the present memory state has a positive anode-cathode voltage of more than 4 volts; (2) the present gate pulse is still present.

The following must be true to set the next memory state: 1. (1) and (2) above are false; and 2. the SCR identified with the next memory state has a positive anodecathode voltage of more than 4 volts. When the firing angle is in the range of 0° ≤ a ≤ 120°, there is a time or pause between memory states, and this pause between memory state is called the "pause state". Logic circuitry that obeys the above rule is disclosed herein.

OBJECTS OF THE INVENTION

It is an object of the invention to provide a three phase DC power supply that is insensitive to phase sequence and operates over the full range of power of the SCRs.

Another object of the invention is to provide an improved DC power supply.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

Figure 1:
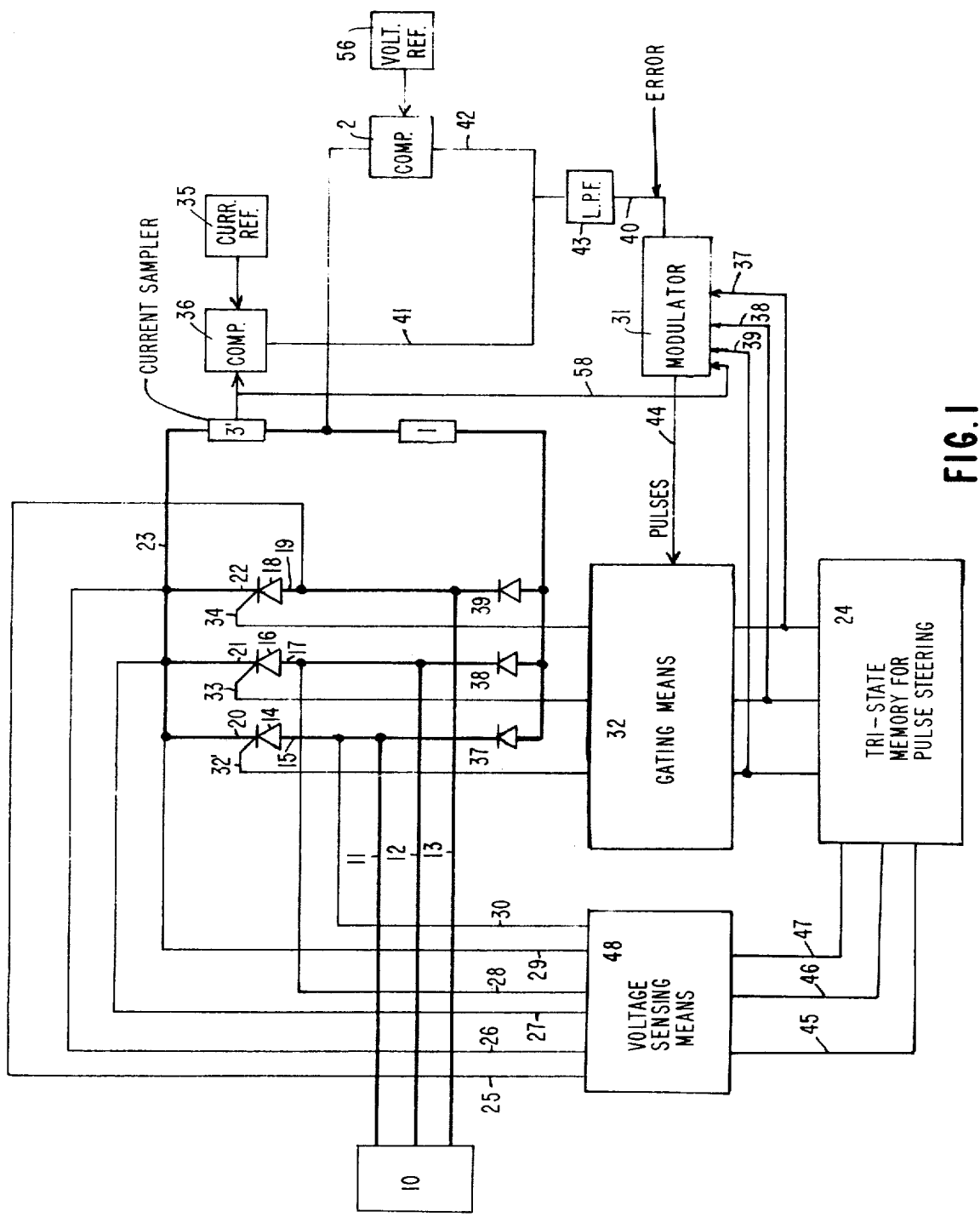
FIG. 1 is a block diagram of the SCR control according to the invention.

Table A, as referred to on page 5, shows the Memory States, as follows:

| A | B | C | |
|---|---|---|---|
| 0 | 1 | 1 | Enable SCR1 |
| 1 | 0 | 1 | Enable SCR2 |
| 1 | 1 | 0 | Enable SCR3 |
| 1 | 1 | 1 | Pause |

DETAILED DESCRIPTION OF THE DRAWINGS

Now with more particular reference to the drawings, the three phase sequence insensitive full range SCR firing circuit has a three phse power source 10 of the usual type, which may be from a three phase 440-volt 60-Hertz power source of a conventional type.

A first SCR 14 has an anode 15 connected to the first power line 11; the second SCR 16 has an anode 17 connected to the second power line 12; and the third SCR 18 has an anode 19 connected to the third power line 13.

The cathodes 20, 21 and 22 of the said SCRs are all connected in common to the load means 1 through a current sampling means 3. Said load is returned to said power lines through rectifiers 37, 38 and 39. A first comparator means 36 compares a sample of the load current with a fixed reference 35 and develops an output 41 proportional to the difference between the load current and the reference. The second comparator means 2 develops an output 42 which is proportional to the difference between the load voltage and second fixed voltage reference 66. The two comparator outputs 41 and 42 are combined and applied to the input of the low pass filter means 43. Low pass filter means 43 is constructed to have fast time response to increases in load voltage and said load current and slow time response to decreases in load voltage and load current. Saturation characteristics of the comparators prevent them from interfering with one another so that the output of said low pass filter 43 is substantially due to whichever load parameter (current or voltage) has the more positive error when compared with their respective references. Modulator means 31 generates pulses which eventually fire the said SCRs. Said pulses are formed in the said modulator means at the rate of three per electrical cycle of said power line 11, 12 and 13. The pulses are phase coherent with the power line voltages. Phase reference inputs 37, 38 and 39 for said modulator are derived from the power line voltages in the tri-state memory means 24.

Phase reference input 58 for the modulator is derived from the A.C. component of the load current. The modulator establishes a single-valued, continuous, monotonic relationship between the level of the error signal 40 at the output of the low pass filter 43 and the phase of the pulses over a range approaching 180 electrical degrees of the power line voltages.

Tri-state memory means 24 has three switching function inputs 45, 46, 47. The purpose of the memory is to provide phase sequence insensitive steering logic for the pulses 44 so that the SCRs are fired in correct sequence independent of the phase sequence of power line voltages. Voltage sensing means 48 derives memory inputs from SCR anode to cathode voltages according to the following:

Input 45 is true whenever SCR 18 has forward anode to cathode voltage greater than 4 volts. Input 46 is true whenever SCR 16 has forward anode to cathode voltage greater than 4 volts. Input 47 is true whenever SCR 14 has forward anode to cathode voltage greater than 4 volts. Said tri-state memory 24 has three latching output states that are called memory states and a fourth, non-latching state called the pause state. The assignment of said states is given in Table A. Said memory changes its output state in response to the inputs 45, 46, 47 according to the following rules:

1. Said memory disregards multiple true inputs; that is, if more than one said SCR has forward anode to cathode voltage greater than 4 volts, no change takes place in the said memory output. 2. An output state of said memory is "set" (latched) when the SCR (14, 16, or 18) identified with the state has more than 4 volts of anode to cathode voltage applied by the power lines (11, 12, 13).

Gating means 32 steers the pulses 44 into the gates 32', 33, 34 of said SCRs such that said SCRs are fired in time sequence as required by any half-controlled converter of usual design. Said time sequence follows the phase sequence of said power lines so that the system of FIG. 1 operates equally well on either phase sequence of said power lines.

Figure 2:
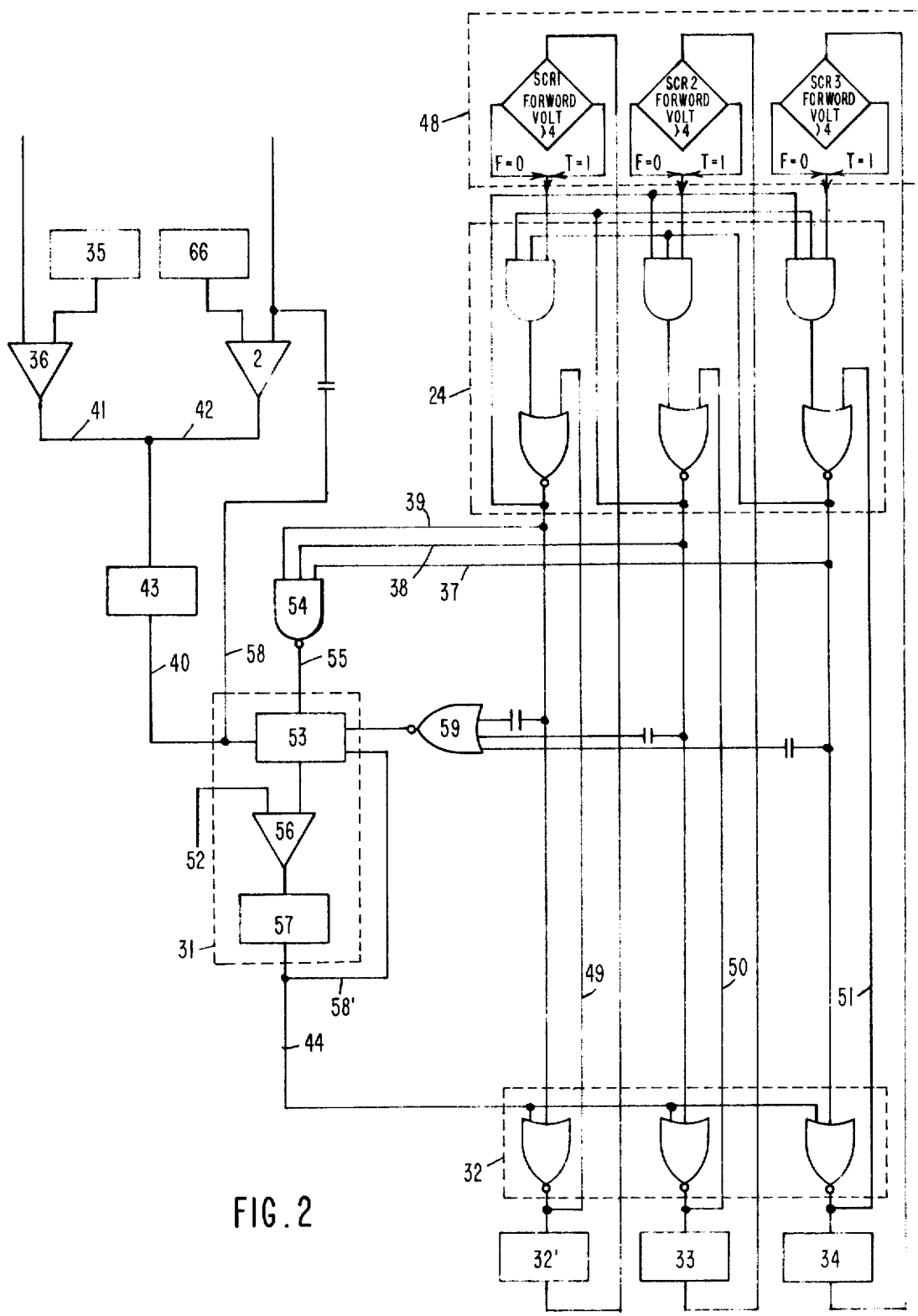
FIG. 2 is a functional diagram of the circuit according to the invention.
Figure 3:
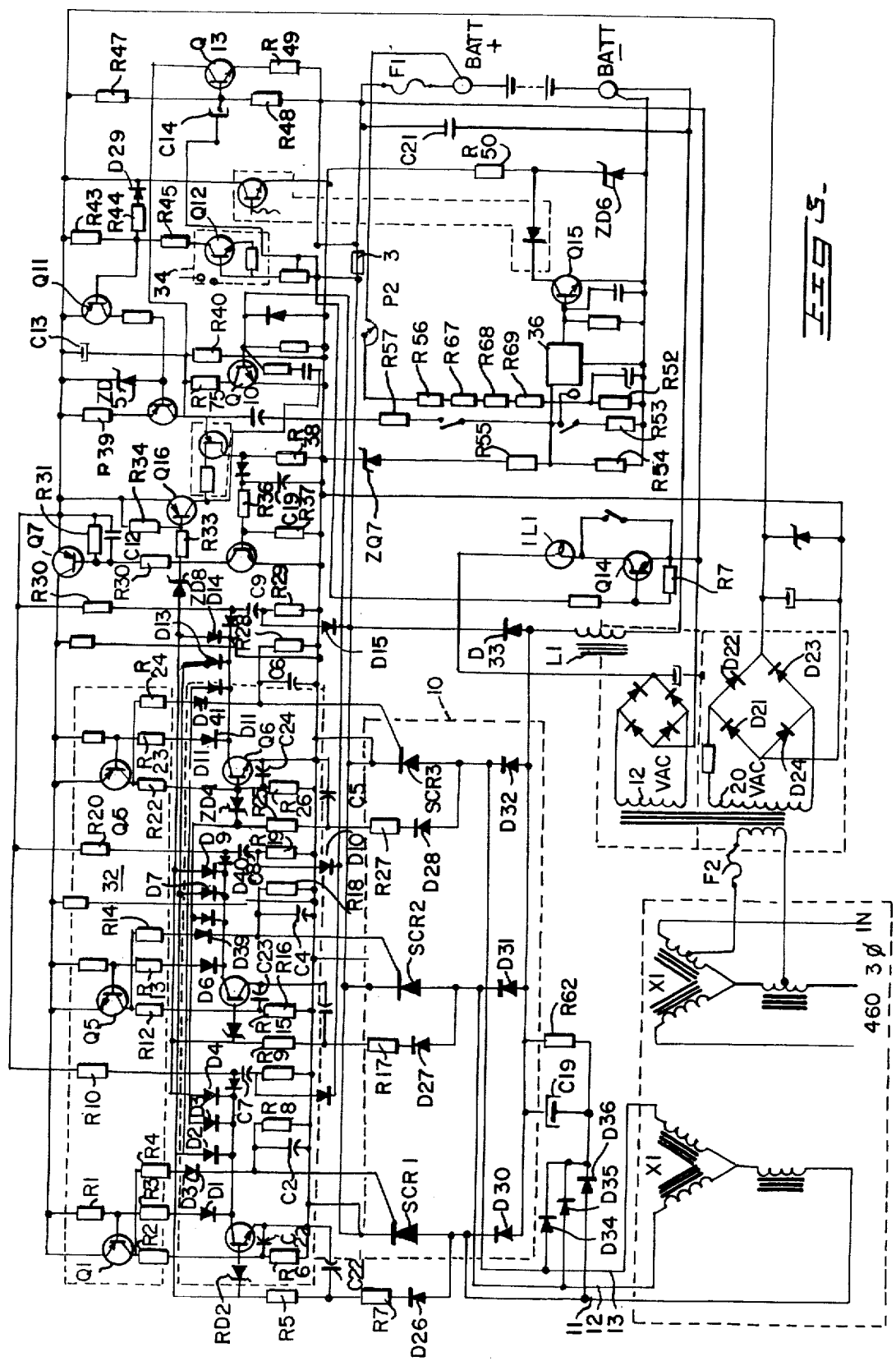
FIG. 3 is a schematic wiring diagram of the circuit according to the invention.

FIG. 2 shows detailed logic diagrams for the elements within the sub-assemblies of FIG. 1. Referring to FIG. 2, the tri-state memory 24 is shown to be constructed of a plurality of "AND" and "NOR" gates. Anyone skilled in the art of logic design will be able to completely understand and construct the tri-state memory after studying the logic diagram within the dotted lines indicated as 24 in FIG. 2. The logic of gating means 32 is also completely disclosed in FIG. 2. The pulses on line 44 are negative. The lines 49, 50, 51 provide feedback to insure that the memory 24 does not change latching states within the duration of the SCR firing pulses.

The logic diagram for the structure of voltage sensing means 48 is not shown in FIG. 2; instead, the logic performed by that structure is shown in the form of standard computer flow chart format. This form of presentation for 48 was chosen to aid understanding. The structure of 48 is very simple; the voltage sensing means 48 is implemented with three zener diodes having zener voltages of 4 volts each. Each zener diode is connected to sense the voltage drop (anode to cathode) across one of the SCRs. when an SCR has more than 4 volts of forward anode to cathode voltage, the zener connected to that SCR conducts and therefore applies a logical "1" at the corresponding input of the memory 24.

The logic diagram for the structure of modulator means 31 is completely disclosed in FIG. 2. Logic block 53 (within the modulator 31) is a ramp generator. The slope of the ramp is function of the level of the system error input to the ramp generator at line 40. Three modes of operation for the ramp generator 53 are possible depending on the range of SCR delay angle as follows:

"Delay angle, $a$", is measured from the usual standard position as defined in most texts on three phase firing circuits: In the range, $0° \leq a \leq 120°$, the voltage ramp generate by 53 is started by ramp enable gate 54. The output 55 of ramp enable gate 54 goes to logical "1" every time one of the power line phases passes through its reference phase angle (at time corresponding to $a = 0$ for that particular phase). The voltage level of the lamp generator is compared with a fixed reference 52 in comparator 56. An SCR firing pulse is produced at the output of comparator 56. The leading edge of this pulse is coincident with the time at which the level of the ramp exceeds the reference 52. The pulses are amplified and widened in 57. Feedback line 58' resets the ramp at the end of the pulse duration. The second mode of operation mentioned above for the ramp generator occurs in the range, $120° \leq a \leq 180°$. In the range, $120° \leq a \leq 180°$, the output 55 of ramp enable gate 54 is at logical 1 continuously and the ramp is phase referenced to the power lines by means of the A.C. component of load current appearing at line 58. The third mode of operation for the ramp generator 53 occurs at power turn on. When three phase power is applied to the power lines, the A.C. coupled gate 59 resets the ramp at $a = 180°$.

The novelty of the invention can be appreciated using the following reasoning:

To successfully operate any half-controlled converter power supply, SCR firing pulses must be formed at the rate of three per power line cycle. These pulses must be capable of being phase modulated over a range of 180 electrical degrees of the power line cycle. Therefore, the modulation range of the pulses must exceed the period of these same pulses by 50%. If the pulses are to be formed within a single phase modulator, as is done in the invented circuit, then this single phase modulator must be capable of 150% phase modulation. The invented circuit has the above mentioned capability (150% modulation range) because of the particular combination of elements exhibited in FIGS. 1 and 2. More specifically, in the modulation range, 0 to 100% (corresponding to the delay angle range, $0° \leq a \leq 120°$), the phase reference inputs 37, 38, 39 take priority over the phase reference input 58. The above mentioned priority is assured by the action of logic gate 54 on the ramp generator 53. The phase reference inputs 37, 38, 39 occur in time sequence so that only one is present during any time interval. In the modulation range, 100% to 150% (corresponding to the delay angle range, $120° \leq a \leq 180°$), the phase reference inputs 37, 38, 39 are all absent so that the modulator references itself to the input 58. It is the action of the memory 24 that causes the phase reference inputs 37, 38, 39 to be absent, as described above. Therefore, the modulator is successful in achieving 150% modulation because of the particular combination of elements shown in FIGS. 1 and 2.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A three phase, sequence insensitive, full range SCR firing circuit comprising
    a three phase power supply comprising three SCRs each having anodes, cathodes, and gates,
    the cathodes of said SCRs being connected to an output line,
    power lines connected to said anodes,
    gating means connected to said gates,
    a tri-state memory means connected to said gating means, said tri-state memory being adapted to follow said power supply phase sequence,
    and a modulator means connected to said tri-state memory means for generating the pulse for said gating means,
    said tri-state memory means being adapted to steer said pulse from said modulator means to said gates of said SCRs whereby the output of said SCRs is controlled over substantially a full range of power output.

2. The circuit recited in claim 1 wherein said tri-state memory means comprises a plurality of AND and NOR circuits.

3. The circuit recited in claim 1 wherein a voltage reference means for sensing load voltage is connected from said output line to said modulator.

4. The circuit recited in claim 3 wherein a voltage reference is provided,
    said voltage reference is connected to a first comparator, said first comparator is connected to said modulator, whereby said modulator is provided with a load voltage reference.

5. The circuit recited in claim 1 wherein a load means is connected to said circuit and a current reference means is connected to load means, and a second comparator is connected to said current reference and to said modulator, whereby said modulator is provided with a load current reference.

6. The circuit recited in claim 1 wherein said circuit includes four separate phase reference means,
    said reference means being connected to said modulator,
    said modulator having means whereby a signal from one of said reference means takes priority over the signals from the other said reference means depending on the range of the firing angle of said reference signals.

7. The circuit recited in claim 1 wherein said tri-state memory means has memory inputs having tru/false logic values that depend on the magnitudes and/or polarities of said three phase line voltages or the magnitudes and/or polarities of the voltages across said SCRs,
    said memory being constructed such that time sequencing of the memory output states follows the phase sequence of said power line voltages.

8. The circuit recited in claim 7 wherein before said memory means is connected to said modulator an providing 150% modulation of the voltage put into said modulator.

9. The circuit recited in claim 1 wherein said modulator means is a single modulator having four separate inputs connected to four separate input means in said circuit.

* * * * *